(12) United States Patent  
Tanaka

(10) Patent No.: US 9,253,408 B2  
(45) Date of Patent: Feb. 2, 2016

(54) PHOTOGRAPHING DEVICE, PHOTOGRAPHING DEVICE CONTROLLING METHOD, PHOTOGRAPHING DEVICE CONTROLLING PROGRAM, AND COMPUTER-READABLE RECORDING MEDIUM IN WHICH PHOTOGRAPHING DEVICE CONTROLLING PROGRAM IS RECORDED

(71) Applicant: OMRON Corporation, Kyoto (JP)

(72) Inventor: Kiyoaki Tanaka, Kizugawa (JP)

(73) Assignee: OMRON CORPORATION, Kyoto-shi (JP)

( * ) Notice: Subject to any disclaimer, the term of this patent is extended or adjusted under 35 U.S.C. 154(b) by 391 days.

(21) Appl. No.: 13/774,138

(22) Filed: Feb. 22, 2013

(65) Prior Publication Data

US 2013/0242113 A1      Sep. 19, 2013

(30) Foreign Application Priority Data

Mar. 15, 2012   (JP) ................................. 2012-058864

(51) Int. Cl.
*H04N 5/232*      (2006.01)

(52) U.S. Cl.
CPC ....... *H04N 5/23296* (2013.01); *H04N 5/23212* (2013.01); *H04N 5/23293* (2013.01)

(58) Field of Classification Search
None
See application file for complete search history.

(56) References Cited

U.S. PATENT DOCUMENTS

2008/0240520 A1   10/2008  Miyata
2010/0103286 A1*   4/2010  Akiyama ................... 348/231.6

FOREIGN PATENT DOCUMENTS

| CN | 101731004 A | 6/2010 |
| JP | 2002-333652 A | 11/2002 |
| JP | 2003-087627 A | 3/2003 |
| JP | 2008-277903 A | 11/2008 |
| JP | 2008-311885 A | 12/2008 |
| JP | 2010-124057 A | 6/2010 |
| JP | 2010-217613 A | 9/2010 |
| JP | 2011-004409 A | 1/2011 |
| JP | 2011-160044 A | 8/2011 |

OTHER PUBLICATIONS

Japanese Office Action for Application No. 2012-058864, issued Sep. 1, 2015 (10 pages).
Chinese Office Action for Application No. 201310058548.7, issued Sep. 25, 2015 (14 pages).

* cited by examiner

*Primary Examiner* — Kate Luo
(74) *Attorney, Agent, or Firm* — Nutter McClennen & Fish LLP; John J. Penny, Jr.

(57) ABSTRACT

A photographing device comprises a detector configured to detect a plurality of subjects from an image photographed by a photographing part; a priority setting part configured to set a priority on each of the plurality of subjects detected by the detector using one or a plurality of pieces of photographing history information, the photographing history information including focused subject information that shows one or a plurality of focused subjects in a history image, the focused subject information being related to the history image, the history image being photographed by the photographing part in the past; a focused subject selector configured to select the subject on which a lens is focused from the plurality of subjects, in order of the priority set by the priority setting part; and a presenting part configured to present the subject selected by the focused subject selector.

14 Claims, 9 Drawing Sheets

| IMAGE ID (411) | IMAGE DATA (412) | PHOTOGRAPHING DATE AND TIME (413) | DETECTED OBJECT (POSITION, SIZE, AND ATTENTION) (414) | USER (415) |
|---|---|---|---|---|
| 001 | *** | 201202181620 | Mr A (($x_1,y_1$),50), Mr B (($x_2,y_2$),60), PUG (($x_3,y_3$),25), MOVING (($x_4,y_4$),150) AF | α |
| 002 | *** | 201202181700 | Mr C (($x_5,y_5$),60), SHIBA-INU (($x_6,y_6$),30) AF | β |
| 003 | *** | 201202181830 | RABBIT (($x_7,y_7$),100), PUG (($x_8,y_8$),100) AF | γ |
| 004 | *** | 201202191200 | Mr C (($x_9,y_9$),150) AF, Mr D (($x_{10},y_{10}$),150) | δ |
| ⋮ | ⋮ | ⋮ | ⋮ | ⋮ |

401

FIG. 12A
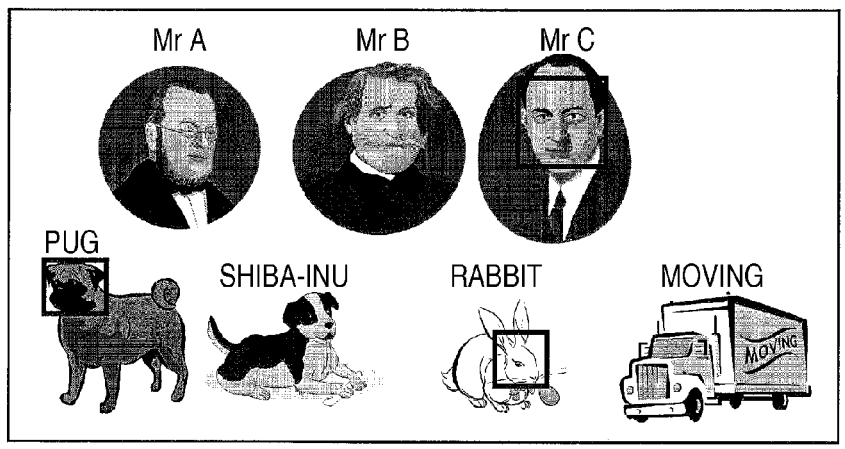
FIG. 12B
FIG. 13A
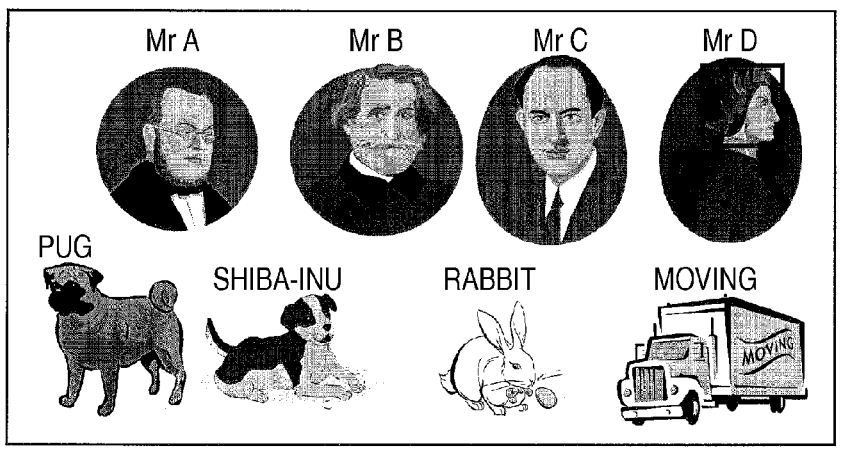
FIG. 13B

PHOTOGRAPHING DEVICE, PHOTOGRAPHING DEVICE CONTROLLING METHOD, PHOTOGRAPHING DEVICE CONTROLLING PROGRAM, AND COMPUTER-READABLE RECORDING MEDIUM IN WHICH PHOTOGRAPHING DEVICE CONTROLLING PROGRAM IS RECORDED

BACKGROUND OF THE INVENTION

1. Technical Field

The present invention relates to a photographing device provided with an object detection function and an autofocus function, a photographing device controlling method, a photographing device controlling program, and a computer-readable recording medium in which the photographing device controlling program is recorded.

2. Related Art

Nowadays, some of photographing devices, such as a digital camera and a mobile phone provided with a camera function, have an autofocus function of detecting not only a human face but also objects, such as an animal face, an automobile, a tree, and a building, to focus automatically on any one of detected objects during photographing.

In the photographing device provided with the autofocus function, it is necessary to decide the object on which the photographing device focuses in some way when plural objects are detected.

For example, in a technology disclosed in Japanese Unexamined Patent Publication No. 2010-124057 (published in Jun. 3, 2010), a time for which a camera photographs the object is recorded for every object (subject) recognized by the camera, a priority is set on the subject in the descending order of the recording time, and the camera focuses on the subject having the higher priority.

In a technology disclosed in Japanese Unexamined Patent Publication No. 2010-217613 (published in Sep. 30, 2010), when plural objects are detected, the object on which the terminal focuses is decided using pieces of data, such as phonebook data, an electronic mail history, an internet search history, and a photographing history, which are stored in the own terminal.

However, conventionally the object (subject) on which the device decides to focus is not always the desired object on which a user wants to focus. For example, in Japanese Unexamined Patent Publication No. 2010-124057, although the camera decides to focus on the object having the longest photographing time, the object having the longest photographing time is not always the desired subject of the user.

In Japanese Unexamined Patent Publication No. 2010-217613, the object on which the terminal focuses is decided using pieces of data, such as the phonebook data, the electronic mail history, the internet search history, and the photographing history, which are stored in the terminal. The pieces of data stored in the terminal is only information with which an interest and a preference of the user are presumed, but the pieces of data do not always agree with the desired object of the user.

The present invention has been devised to solve the problems described above, and an object thereof is to construct a photographing device that decides the object that probably becomes the desired object of the user as the focused object.

SUMMARY

In accordance with one aspect of at least one embodiment of the present invention, a photographing device comprises a first photographing part configured to photograph a plurality of subjects; an autofocus part configured to focus a lens on any one of the subjects; a detector configured to detect the plurality of subjects from an image photographed by the first photographing part; a priority setting part configured to set a priority on each of the plurality of subjects detected by the detector using one or a plurality of pieces of photographing history information, the photographing history information including focused subject information that shows one or a plurality of focused subjects in a history image, the focused subject information being related to the history image, the history image being photographed by the first photographing part in the past; a focused subject selector configured to select the subject on which the autofocus part focuses the lens from the plurality of subjects, in order of the priority set by the priority setting part; and a presenting part configured to present the subject selected by the focused subject selector.

In accordance with another aspect of at least one embodiment of the present invention, a method for controlling a photographing device, the photographing device comprising a photographing part configured to photograph a plurality of subjects and an autofocus part configured to focus a lens on any one of the subjects, the method comprising the steps of: detecting the plurality of subjects from an image photographed by the photographing part; setting a priority on each of the plurality of subjects detected in the detecting step using one or a plurality of pieces of photographing history information, the photographing history information including focused subject information that shows one or a plurality of focused subjects in a history image, the focused subject information being related to the history image, the history image being photographed by the photographing part in the past; selecting the subject on which the autofocus part focuses the lens in the plurality of subjects in order of the priority set by the priority setting part; and presenting the subject selected by the focused subject selecting step.

According to the configuration and method, the priority of the subject is set using the focused subject information indicating the focused subject in the history image, and the focused subject that is the subject on which the lens is focused is selected from the detected subjects using the set priority.

Therefore, the focused subject is selected using the information indicating whether the subject becomes the focused subject in the past, so that the subject that probably becomes the subject on which the lens is focused can be selected as the focused subject. In other words, a prospect to select the subject that the user considers as the focusing target, namely the desired subject of the user, as the focused subject can be enhanced.

In the photographing device, the priority setting part that sets the priority using the plurality of pieces of photographing history information may count a number of times at which each subject is focused on in the plurality of pieces of photographing history information, and sets a higher priority on the subject having a larger count value.

According to the configuration, the priority setting part sets the higher priority on the subject that frequently becomes the focused subject in the past. Therefore, the higher priority can be set on the subject having the high prospect to become the focused subject from the past tendency.

In the photographing device, the priority setting part that sets the priority using the plurality of pieces of photographing history information may count a number of times at which each subject is focused on in the plurality of pieces of photographing history information by each category to which the subject belongs, set a higher priority on the subject included in a category having a larger count value, and set a higher priority on the focused subject having a larger count value in the subjects included in the identical category.

According to the configuration, the priority setting part counts the number of subjects that become the focused subject in the past in each category including the subject, and sets the priority on the subject in each category. In the subjects included in the identical category, the priority is set depending on the number of times in each of which the subject becomes the focused subject in the past.

Therefore, the priority can be set in each category. Even if a certain subject has the small number of times in each of which the subject becomes the focused subject in the past, when another subject included in the identical category has the large number of times in each of which the subject becomes the focused subject in the past, the higher priority can be set on the certain subject.

In the photographing device, photographing date and time may be correlated with the history image in the photographing history information, and the priority setting part that sets the priority using the plurality of pieces of photographing history information may set a highest priority on the subject when the subjects are identical to each other in the pieces of photographing history information in which the most recent photographing dates and times are continued.

According to the configuration, the highest priority can be set on the subject that recently continuously becomes the focused subject. Therefore, in the case that the identical subject is continuously photographed, the highest priority can be set on the continuously-photographed subject.

In the photographing device, subject information indicating the subject included in the history image may be correlated with the history image in the photographing history information, and the priority setting part may set a higher priority on the focused subject than that of a non-focused subject that is the subject on which the lens is not focused in the subjects indicated by the subject information.

According to the configuration, in the subjects of the identical image, the higher priority is set on the subject that becomes the focused subject than other subjects. Therefore, the priority can be set according to a relationship between the past subjects.

In the photographing device, subject information indicating the subject included in the history image may be correlated with the history image and size information indicating a size of the subject included in the history image is correlated with the subject information in the photographing history information, and the priority setting part may set a higher priority on the focused subject than a non-focused subject that is the subject on which the lens is not focused when the size of the focused subject is smaller than the size of the non-focused subject in the subjects indicated by the subject information.

According to the configuration, in the subjects of the identical image, in the case that the size of the focused subject is smaller than the sizes of other subjects, the higher priority is set on the subject that becomes the focused subject than other subjects. Because the subject becomes the focused subject although the size of the subject is smaller than the sizes of other subjects, probably the subject that becomes the focused subject is more important for the user. Therefore, the higher priority can be set on the subject having the higher prospect of the focusing target.

In the photographing device, subject information indicating the subject included in the history image may be correlated with the history image and positional information indicating a position of the subject included in the history image is correlated with the subject information in the photographing history information, and the priority setting part may set a higher priority on the focused subject than a non-focused subject that is the subject on which the lens is not focused when the position of the focused subject is located more peripheral than the position of the non-focused subject in the history image in the subjects indicated by the subject information.

According to the configuration, in the subjects of the identical image, in the case that the position of the focused subject more peripheral than the positions of other subjects in the image, the higher priority is set on the subject that becomes the focused subject than other subjects. Because the subject becomes the focused subject although the subject is located near the edge compared with other subjects, probably the subject that becomes the focused subject is more important for the user. Therefore, the higher priority can be set on the subject having the higher prospect of the focusing target.

In the photographing device, subject information indicating the subject included in the history image may be correlated with the history image in the photographing history information, and the priority setting part that sets the priority using the plurality of pieces of photographing history information may set a higher priority on the subject in which the subject information is not included in the photographing history information.

According to the configuration, the higher priority is set on the subject that is not included in the history image. In the case that the subject that is not photographed in the past is included in the current photographed image, probably the subject is the photographing target. Therefore, the higher priority can be set on the subject having the higher prospect of the photographing target.

In the photographing device, the focused subject selector may select a predetermined number of subjects on which the lens is focused in a descending order of the priority set by the priority setting part.

According to the configuration, the predetermined number of subjects is presented in the descending order of the priority, so that a plurality of targets of the focused subjects can be presented to the user.

The photographing device may further comprise: a photographing history information storage in which the photographing history information is stored; a receiving part configured to receive whether the focused subject presented by the presenting part is correct; and a storage controller configured to store the focused subject information indicating the focused subject in the photographing history information storage while correlating the focused subject information with the photographed image when the receiving part receives focused subject presented by the presenting part as correct.

According to the configuration, the photographed image and the focused subject information indicating the focused subject in the photographed image can be stored in the photographing history information storage while correlated with each other.

The photographing device may further comprise: a detected subject presenting part configured to present the subject detected by the detector from a subject selecting photographed image, which is photographed in order to select the subject by the first photographing part; and a selection receiving part configured to receive selection of the focused subject from the subjects presented by the detected subject presenting part, wherein the storage controller stores the focused subject information indicating the focused subject in which the selection is received by the selection receiving part in the photographing history information storage as the photographing history information while correlating the focused subject information with the subject selecting photographed image.

According to the configuration, the focused subject information indicating the focused subject can be stored in the photographing history information storage. Therefore, in the case that the photographing history does not exist or in the case that a few photographing histories exist, the priority can properly be set using the photographing history information stored in the photographing history information storage.

The photographing device may further comprise: a second photographing part configured to photograph a photographer who photographs the photographed image; and a photographer identifying part configured to identify the photographer photographed by the second photographing part, wherein user identification information identifying a user who photographs the history image is correlated with the history image in the photographing history information, and the priority setting part sets the priority using the photographing history information that agrees with the photographer identified by the photographer identifying part.

According to the configuration, the photographer of the photographed image is identified while the photographing history is correlated with the user. Therefore, the priority can be set in a unit of user, and the priority can properly be set in each user even if the plural persons use the identical photographing device.

The photographing device may be constructed by a computer. In this case, the present invention includes a photographing device controlling program that causes the computer to operate as each part to construct the photographing device and a tangible, non-transitory computer-readable recording medium in which the photographing device controlling program is recorded.

As described above, the photographing device of at least one embodiment of the present invention comprises: comprises a first photographing part configured to photograph a plurality of subjects; an autofocus part configured to focus a lens on any one of the subjects; a detector configured to detect the plurality of subjects from an image photographed by the first photographing part; a priority setting part configured to set a priority on each of the plurality of subjects detected by the detector using one or a plurality of pieces of photographing history information, the photographing history information including focused subject information that shows one or a plurality of focused subjects in a history image, the focused subject information being related to the history image, the history image being photographed by the first photographing part in the past; a focused subject selector configured to select the subject on which the autofocus part focuses the lens from the plurality of subjects, in order of the priority set by the priority setting part; and a presenting part configured to present the subject selected by the focused subject selector.

The photographing device controlling method of at least one embodiment of the present invention comprises the steps of: detecting the plurality of subjects from an image photographed by the first photographing part; setting a priority on each of the plurality of subjects detected in the detecting step using one or a plurality of pieces of photographing history information, the photographing history information including focused subject information that shows one or a plurality of focused subjects in a history image, the focused subject information being related to the history image, the history image being photographed by the first photographing part in the past; selecting the subject on which the autofocus part focuses the lens in the plurality of subjects in order of the priority set by the priority setting part; and presenting the subject selected by the focused subject selecting step.

Therefore, the focused subject is selected using the information on whether the subject becomes the focused subject in the past, so that advantageously the subject having the high prospect to become the focusing target can be selected as the focused subject. In other words, the prospect to select the subject that the user considers as the focusing target, namely the desired subject of the user, as the focused subject can be enhanced.

BRIEF DESCRIPTION OF THE DRAWINGS

FIGS. 12A and 12B are views illustrating an attention object deciding method presented by the attention object presenting part of the photographing device;

FIGS. 13A and 13B are views illustrating an attention object deciding method presented by the attention object presenting part of the photographing device;

DETAILED DESCRIPTION

Hereinafter, an embodiment of the present invention will be described with reference to FIGS. 1 to 16. An outline of the embodiment of the present invention will be described with reference to FIGS. 2 and 3.

Outline of the Embodiment of the Invention

A photographing device 1 according to an embodiment is provided with an object detection function and an autofocus function. The photographing device 1 decides and photographs a focused object from detected objects based on a priority, which is set using a photographing history including information indicating an object (subject) on which the photographing device 1 already focuses in the past.

The priority is set using the photographing history including the information indicating the object on which the photographing device 1 already focuses in the past, which allows photographing device 1 to decide the object, which is the subject (object) on which a user probably wants to focus on, as a focusing target.

Figure 2:
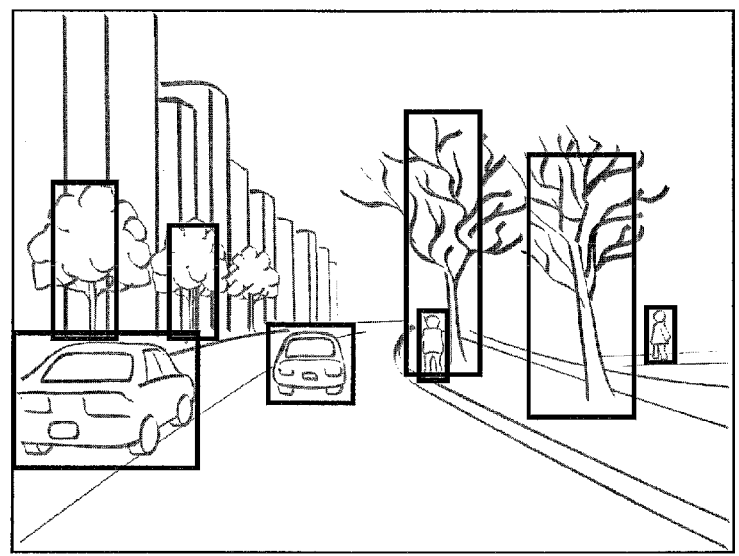
FIG. 2 is a view illustrating an outline when the photographing device photographs an image.

For example, in the case that an image in FIG. 2 is photographed, a "tree", an "automobile" and a "person" are detected as the object (subject). In FIG. 2, four "trees", two "automobiles" and two "person" are detected. At this point, for example, in the technology disclosed in Japanese Unexamined Patent Publication No. 2010-124057, one of the four trees is the focused object in the detected objects. Because the automobiles and the persons move, it is difficult that the automobiles and the persons are photographed for a time longer than that of the trees.

Figure 3:
FIG. 3 is a view illustrating the outline when the photographing device photographs the image.

On the other hand, in the embodiment, the priority is set using the photographing history including the information indicating the object on which the photographing device 1 already focuses in the past, and the object having the higher priority is decided as the focusing target. For example, when the automobile existing in the center of the image has the highest priority as a result of the priority, which is set using the photographing history including the information indicating the object on which the photographing device 1 already focuses in the past, the automobile is decided as the focusing target (FIG. 3).

Because the object detection function and the autofocus function can be implemented by the well-known technology, the description is omitted.

(Configuration of Photographing Device 1)

Figure 1:
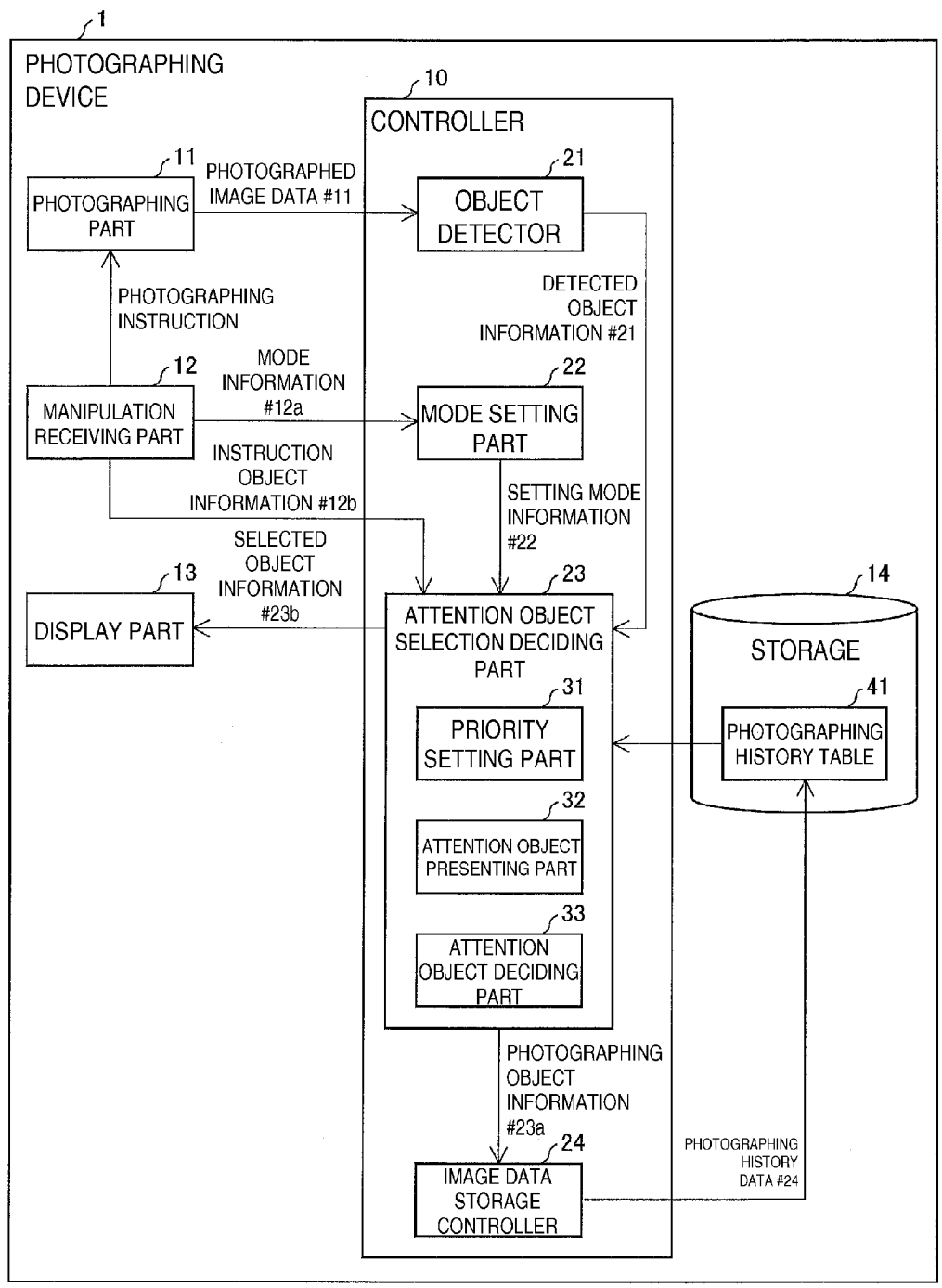
FIG. 1 is a block diagram illustrating a configuration of a main portion of a photographing device according to an embodiment of the present invention.

A configuration of the photographing device 1 will be described below with reference to FIGS. 1 and 4 to 13. A configuration of a main portion of the photographing device 1 will be described below with reference to FIG. 1. FIG. 1 is a block diagram illustrating the configuration of the main portion of the photographing device 1.

As illustrated in FIG. 1, the photographing device 1 includes a controller 10, a photographing part (a first photographing part and a second photographing part) 11, a manipulation receiving part 12, a display part 13, and a storage 14.

The photographing part 11 performs the photographing to generate photographed image data. For example, the photographing part 11 includes an imaging element, such as a CCD (Charge Coupled Device) and a CMOS (Complementary Metal-oxide Semiconductor) image sensor, which converts light from a photographing target into an electric signal, and a video processing circuit that converts the electric signal from the imaging element into digital video data of each of RGB colors. The photographing part 11 transmits the generated photographed image data to an object detector 21 of the controller 10. The photographing part 11 is provided with the AF (autofocus) function.

In the embodiment, the photographing device 1 may include two photographing parts (the first photographing part and the second photographing part) 11 that photographs the photographing target while photographing the user (a photographer) who performs the photographing. The photographer who photographs the photographed image is specified by photographing the photographer, and the photographed image and the photographer can be stored in the storage 14 while correlated with each other.

The manipulation receiving part 12 receives such manipulations performed to the photographing device 1 as a manipulation to set the focused object, a manipulation to check whether the focused object decided by the photographing device 1 is suitable, and a manipulation to set a mode (an attention object storage mode and a photographing mode) described later. The manipulation receiving part 12 may have a configuration in which various manipulation buttons are provided in a chassis of the photographing device 1 or a configuration in which the manipulation receiving part 12 is overlapped as a touch panel with the display part 13. The manipulation receiving part 12 may have a configuration in which the both are combined.

The display part 13 displays the photographed image and a presentation of the focused object. The display part 13 may be constructed by any display device as long as the display device can display information. Examples of the display part 13 include a liquid crystal display, an organic EL (Electro Luminescence) display, and a plasma display.

Figures 4, 5:
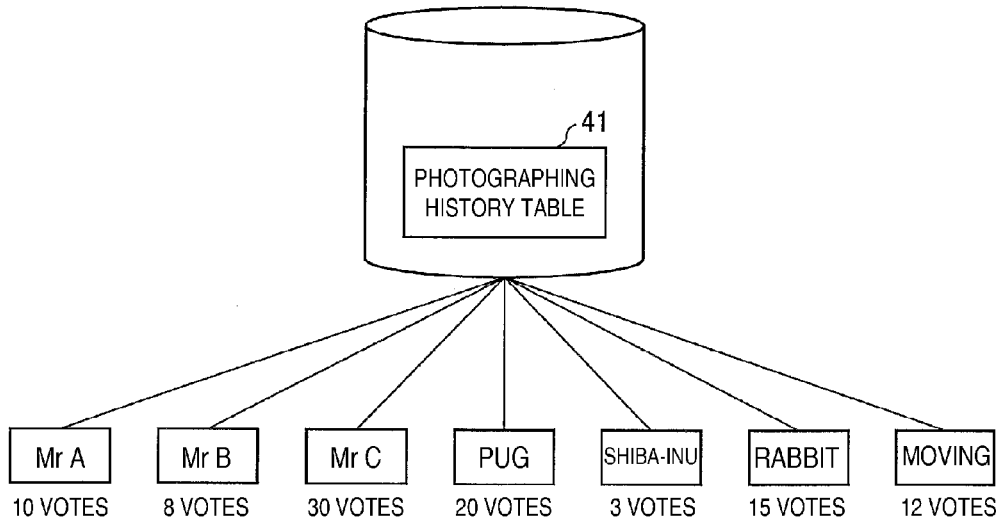
FIG. 4 is a view illustrating a photographing history table stored in a storage of the photographing device.
FIG. 5 is a view illustrating a priority setting method performed by a priority setting part of the photographing device.

The storage 14 is a memory in which photographing history information including the photographed image data is stored. The photographing history information is stored in the form of a photographing history table 41. FIG. 4 illustrates an example of the photographing history table 41.

As illustrated in FIG. 4, in the photographing history table 41, an image ID 411, image data 412, photographing date and time 413, a detected object (a position, a size, and attention) 414, and a user 415 (user identification information) are correlated with one another.

The image ID 411 is information used to identify the image. The image data 412 is data of the photographed image, and the photographing date and time 413 are photographing date and time.

The detected object (the position, the size, and the attention) 414 indicates the object detected in the photographed image, the size of the object, and the position of the object in the photographed image. For example, the size of the object can be indicated by the number of pixels. For example, the position of the object can be indicated by a coordinate in the photographed image. The "attention" indicates that the object is the focusing target in the photographed image. In the photographing history table 401, the attention is indicated by "AF"

The user 415 indicates the photographer of the photographed image.

In the example of the photographing history table 401 in FIG. 4, the image ID 411 of "001", the image data (history image) 412 of "*", the photographing date and time 413 of "201202181620", the detected objects (the position (positional information), the size (size information), and the attention) 414 of "Mr A ((x1, y1), 50)", "Mr B ((x2, y2), 60)", "pug ((x3, y3), 25)", and "moving ((x4, y4), 50) AF", and the user 415** of "α" are stored while correlated with one another.

At this point, in the detected object (the position, the size, and the attention) 414, (x, y) indicates the position (the coordinate) of the object, and a numerical character following (x, y) indicates the size (the number of pixels) of the object. Therefore, in this case, Mr A is detected at the position of (x1, y1) with the size of "50". The same holds true for other objects, such as Mr B and the pug. Because "AF" (focused subject information) is added to the moving, the photographing device 1 focuses on the "moving" in the detected objects of "Mr A", "Mr B", "pug", and "moving". That is, "moving" is the focused subject.

Information indicating a category in which each object is included may be added to the information on the detected object. For example, information indicating a category of "person" may be added when the detected objects are "Mr A" and "Mr B", and information indicating a category of "animal" may be added when the detected objects are "pug" and "shiba-inu". The priority can be set using the category by adding the category information.

The same holds true for the image IDs 411 of "002", "003", . . . .

The controller 10 controls selection of the attention object (the focused object) and various operations including decision processing in the photographing device 1. The controller 10 includes an object detector 21, a mode setting part 22, an attention object selection deciding part 23, and an image data storage controller 24.

The object detector 21 detects the object included in the photographed image from photographing image data #11 transmitted from the photographing part 11, and transmits detected object information #21 indicating the detection result to the attention object selection deciding part 23. More particularly, in the case that two persons (Mr A and Mr B), one animal (pug), and one automobile (moving) are included as the objects in the photographed image, the object detector 21 detects "Mr A", "Mr B", "pug", and "moving", and transmits the positions and the sizes thereof in the photographed image to the attention object selection deciding part 23.

In the case that the photographed image of the photographer is included in the photographing image data #11, the object detector 21 identifies the photographer, and transmits the photographed image and the photographer to the attention object selection deciding part 23 while correlating the photographed image and the photographer with each other.

The object detection means that the object included in the photographed image is detected. In addition, the object detection means that a face of a person can be detected when the object is the person and that a kind of an animal can be detected when the object is the animal. Because this can be implemented by the well-known technology, the description is omitted.

The mode setting part 22 sets a mode from mode information #12a indicating a mode setting received by the manipulation receiving part 12, and transmits setting mode information #22 indicating the set mode to the attention object selection deciding part 23. The mode includes an attention object storage mode in which the image to which the attention object is set is stored in the storage 14 and a photographing mode in which the photographing is performed. Pieces of processing in the attention object storage mode and the photographing mode are described in detail later.

In the photographing mode, the attention object selection deciding part 23 selects the object on which the photographing device 1 focuses from the objects, which are included in the photographed image and indicated by the detected object information #21 received from the object detector 21, presents the selected result, and decides the object on which the photographing device 1 focuses based on an instruction (instruction object information #12b) from the user to the presentation. The attention object selection deciding part 23 transmits photographing object information #23a including information indicating the decided object to the image data storage controller 24. The attention object selection deciding part 23 will be described in detail later.

In the attention object storage mode, the attention object selection deciding part 23 transmits image information including information indicating the specified attention object to the image data storage controller 24.

The image data storage controller 24 generates photographing history data #24, in which the photographed image, the detected object, the object on which the photographing device 1 focuses, and the photographer (in the case that the information indicating the photographer is included) are correlated with one another, based on the photographing object information #23a received from the attention object selection deciding part 23, and stores the photographing history data #24 in the photographing history table 41 of the storage 14.

(Configuration of Attention Object Selection Deciding Part 23)

The attention object selection deciding part 23 includes a priority setting part 31, an attention object presenting part 32, and an attention object deciding part 33.

(Priority Setting Part 31)

The priority setting part 31 sets the priority on the object included in the detected object information #21 based on the photographing history table 41 stored in the storage 14. The priority setting part 31 transmits the information indicating the set priority to the attention object presenting part 32. Some methods in which the priority setting part 31 sets the priority will be described with reference to FIGS. 5 to 10.

(Priority Setting Method 1)

The priority setting part 31 decides the priority based on the number of attention objects, namely the number of objects on which the photographing device 1 focuses, in the photographing history included in the photographing history table 41. The specific description will be made with reference to FIG. 5. For example, as illustrated in FIG. 5, it is assumed that the detected object information #21 includes "Mr A", "Mr B", "Mr C", "pug", "shiba-inu", "rabbit", and "moving", and that the number of attention objects is 10 votes for "Mr A", 8 votes for "Mr B", 30 votes for "Mr C", 20 votes for "pug", 3 votes for "shiba-inu", 15 votes for "rabbit", and 12 votes for "moving" in the photographing history stored in the photographing history table 41. In this case, the priority setting part 31 sets the highest priority on "Mr C" having the largest number of votes.

In the case that the number of attention objects is 10 votes for "Mr A", 8 votes for "Mr B", 30 votes for "Mr C", 20 votes for "pug", 3 votes for "shiba-inu", 15 votes for "rabbit", and 12 votes for "moving" in all the photographing histories stored in the photographing history table 41, the priority setting part 31 sets the priority based on the number of votes.

(Priority Setting Method 2)

Figure 6:
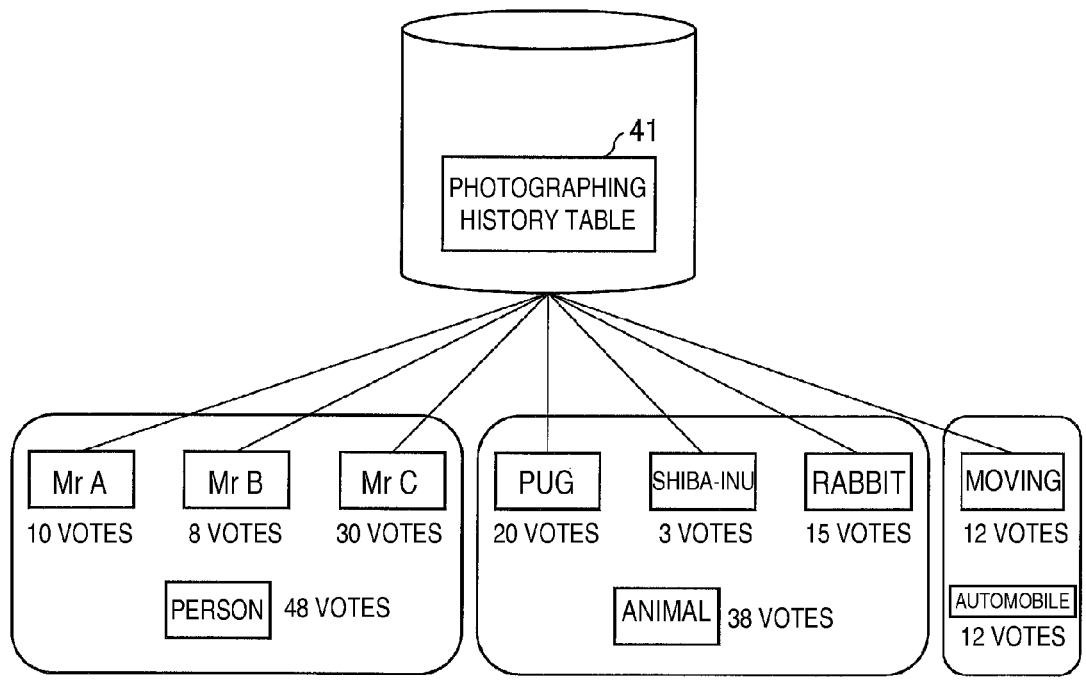
FIG. 6 is a view illustrating a priority setting method performed by the priority setting part of the photographing device.

The priority setting part 31 decides the priority based on a quantity in which the attention objects are grouped together in each category in the photographing history included in the photographing history table 41. For example, as illustrated in FIG. 6, in the case that the number of attention objects is 10 votes for "Mr A", 8 votes for "Mr B", 30 votes for "Mr C", 20 votes for "pug", 3 votes for "shiba-inu", 15 votes for "rabbit", and 12 votes for "moving" in the all photographing histories stored in the photographing history table 41, the person (Mr A, Mr B, and Mr C) has 48 votes, and the animal (pug and shiba-inu) has 38 votes, and the automobile (moving) has 12 votes when the attention objects are divided into categories. The priority is set in each of the categories of "person", "animal", and "automobile". In the example in FIG. 6, "person"→"animal"→"automobile" is obtained in the descending order of the priority. In each category, the priority is set depending on the number of attention objects. For example, in the category of "person", "Mr C" (30 votes) →"Mr A" (10 votes)→"Mr B" (8 votes) is obtained in the descending order of the priority.

(Priority Setting Method 3)

Figure 7:
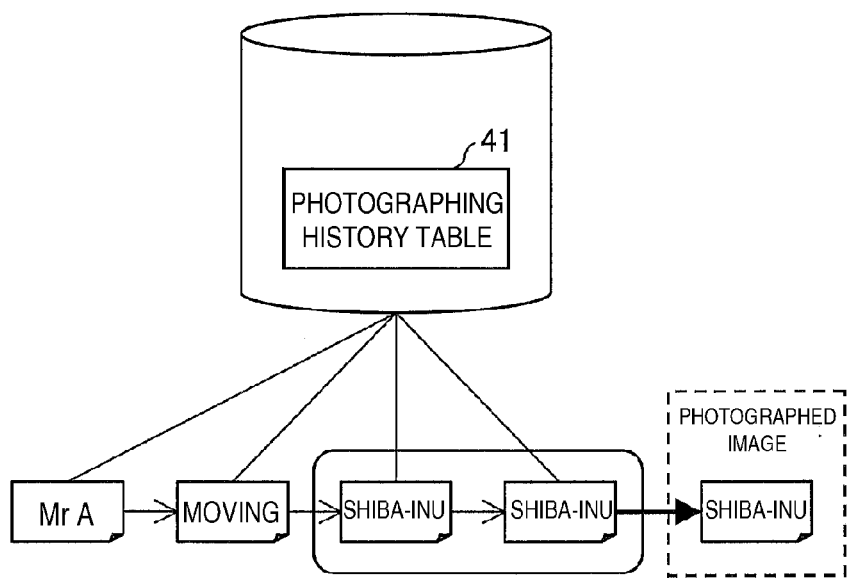
FIG. 7 is a view illustrating a priority setting method performed by the priority setting part of the photographing device.
Figure 8:
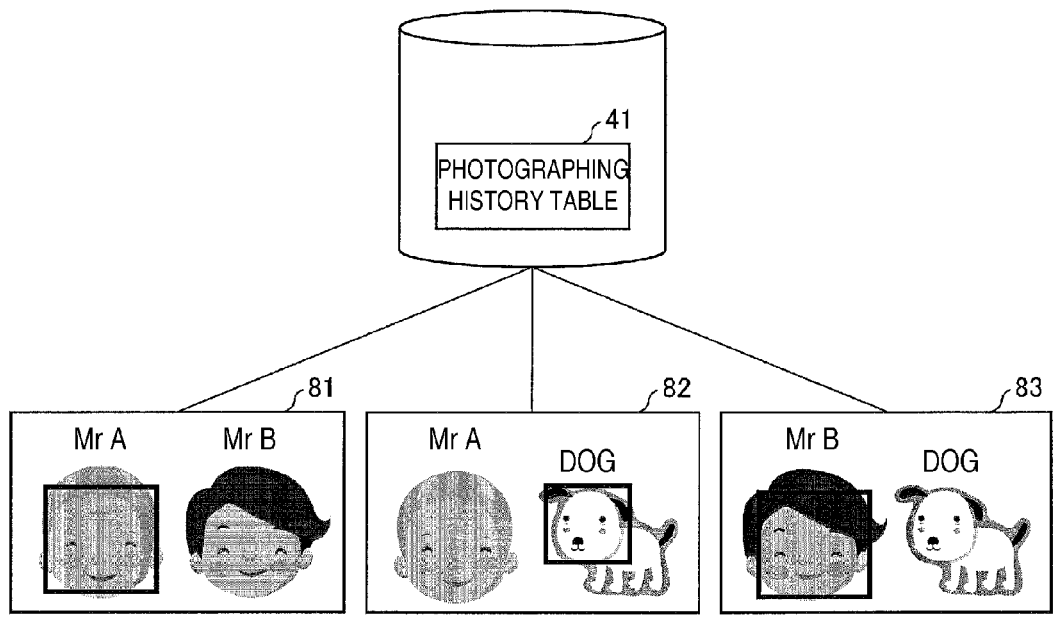
FIG. 8 is a view illustrating a priority setting method performed by the priority setting part of the photographing device.
Figure 9:
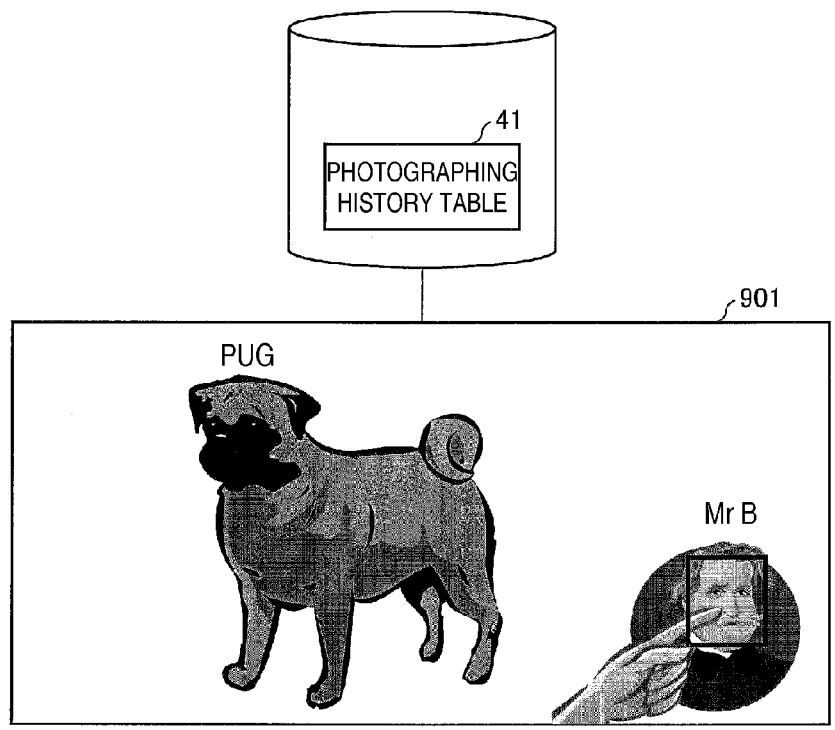
FIG. 9 is a view illustrating a priority setting method performed by the priority setting part of the photographing device.
Figure 10:
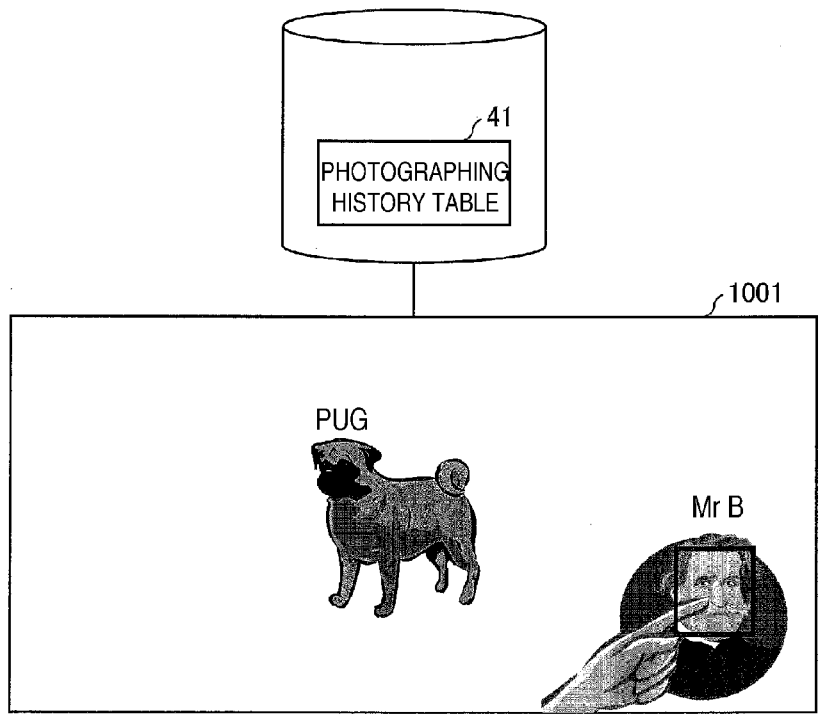
FIG. 10 is a view illustrating a priority setting method performed by the priority setting part of the photographing device.

The priority setting part 31 sets the higher priority on the object that recently continuously becomes the attention object in the photographing history stored in the photographing history table 41. For example, as illustrated in FIG. 7, in the case that "shiba-inu" recently continuously becomes the attention object twice, the highest priority is set on "shiba-inu". When the priority is set similarly to the priority setting method 1, in the object that continuously becomes the attention object, the priority may be set by multiplying the object by a weight of the number of votes such that the first image is "1 vote", the second image is "1.2 votes", and the third image is "1.5 votes".

(Priority Setting Method 4)

The priority setting part 31 decides the priority between the objects from a relationship between the object that becomes the attention object and the object that does not become the attention object in each photographed image of the photographing history included in the photographing history table 41. For example, as illustrated in a photographed image example 81 in FIG. 8, Mr A and Mr B are detected from the photographed image, and the higher priority is set on Mr A in the case that Mr A becomes the attention object. In this case, the priority setting part 31 sets the higher priority on Mr A than Mr B. In a photographed image example 82, Mr A and a dog are detected from the photographed image, and the dog becomes the attention object. Therefore, in this case, the priority setting part 31 sets the higher priority on the dog between Mr A and the dog. Similarly, in a photographed image example 83, Mr B and the dog are detected from the photographed image, and Mr B becomes the attention object. Therefore, in this case, the priority setting part 31 sets the higher priority on Mr B than the dog.

(Priority Setting Method 5)

The priority setting part 31 decides the priority between the objects from a relationship between the object that becomes the attention object and the object that does not become the attention object in the photographed image of the photographing history included in the photographing history table 41. For example, as illustrated in a photographed image example 901 in FIG. 9, the pug and Mr B are detected from the photographed image, and Mr B becomes the attention object although the size of the pug is larger than the size of Mr B in the photographed image. In this case, the priority setting part 31 sets the higher priority on Mr B than the pug.

(Priority Setting Method 6)

The priority setting part 31 decides the priority between the objects from a relationship between the object that becomes the attention object and the object that does not become the attention object in the photographed image of the photographing history included in the photographing history table 41. For example, as illustrated in a photographed image example 1001 in FIG. 10, the pug and Mr B are detected from the photographed image, and Mr B becomes the attention object although the pug is located in the center while Mr B is located near the edge of the photographed image. In this case, the priority setting part 31 sets the higher priority on Mr B than the pug.

As described above, the priority setting part 31 can set the priority by various methods. The above methods may solely be performed, or the method may be performed by combining the methods if possible.

(Attention Object Presenting Part 32)

The attention object presenting part 32 sets the attention object from the objects detected by the object detector 21 based on the priority set by the priority setting part 31, transmits selected object information #23b indicating the set attention object to display part 13, and presents the selected object information #23b on the display part 13. An attention object presenting method will be described below with reference to FIGS. 11 to 13.

(Attention Object Presenting Method 1)

Figure 11A:
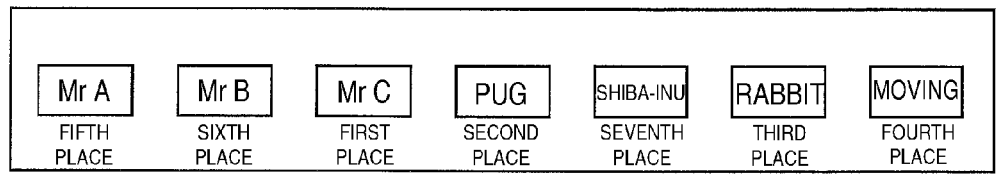
FIGS. 11A and 11B are views illustrating an attention object deciding method presented by an attention object presenting part of the photographing device.
Figure 11B:
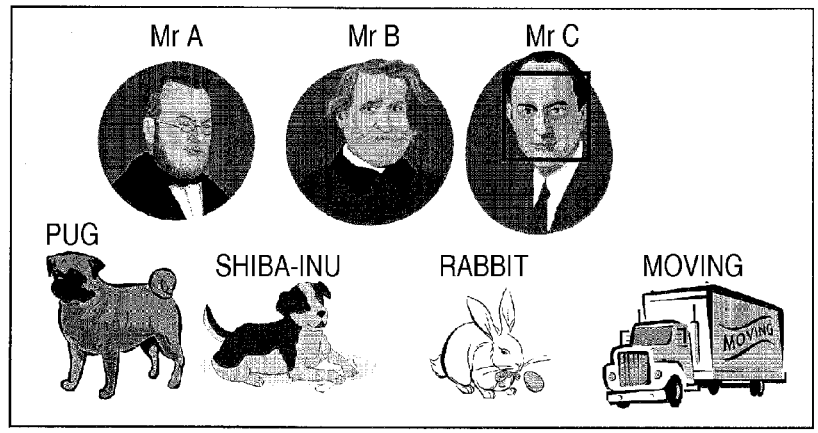

The attention object presenting part 32 presents the object having the highest priority set by the priority setting part 31 as the attention object. The specific description will be made with reference to FIGS. 11A and 11B. In an example in FIG. 11, the priority setting part 31 sets the fifth priority on Mr A, the sixth priority on Mr B, the first priority on Mr C, the second priority on the pug, the seventh priority on the shiba-inu, the third priority on the rabbit, and the fourth priority on the moving (FIG. 11A). In the case that the object detector 21 detects the objects of "Mr A", "Mr B", "Mr C", "pug", "shiba-inu", "rabbit", and "moving" as illustrated in FIG. 11B, the attention object presenting part 32 presents Mr C having the highest priority as the attention object.

(Attention Object Presenting Method 2)

The attention object presenting part 32 presents the predetermined number (e.g. three) of objects as the attention objects in the descending order of the priority set by the priority setting part 31. The specific description will be made with reference to FIGS. 12A and 12B. In an example in FIG. 12, the priority setting part 31 sets the fifth priority on Mr A, the sixth priority on Mr B, the first priority on Mr C, the second priority on the pug, the seventh priority on the shiba-inu, the third priority on the rabbit, and the fourth priority on the moving (FIG. 12A). In the case that the object detector 21 detects the objects of "Mr A", "Mr B", "Mr C", "pug", "shiba-inu", "rabbit", and "moving" as illustrated in FIG. 12B, the attention object presenting part 32 presents the three objects having the higher priorities, namely Mr C, the pug, and the rabbit, as the attention object.

(Attention Object Presenting Method 3)

The attention object presenting part 32 presents the object, which is referred to by the priority setting part 31 in order to set the priority and not stored in the photographing history table 41, as the attention object. The specific description will be made with reference to FIGS. 13A and 13B. In an example in FIG. 13, the priority setting part 31 sets the fifth priority on Mr A, the sixth priority on Mr B, the first priority on Mr C, the second priority on the pug, the seventh priority on the shiba-inu, the third priority on the rabbit, and the fourth priority on the moving (FIG. 13A). It is assumed that Mr D is not stored in the photographing history table 41, namely Mr D is not photographed in the past.

In the case that the object detector 21 detects the objects of "Mr A", "Mr B", "Mr C", "Mr D", "pug", "shiba-inu", "rabbit", and "moving" as illustrated in FIG. 13B, the attention object presenting part 32 presents Mr D that is not photographed in the past as the attention object.

In the case that the object that is not photographed in the past is presented as the attention object, the priority setting part 31 may set the highest priority on the object, and the attention object presenting part 32 may set the attention object based on the priority set by the priority setting part 31.

(Attention Object Deciding Part)

The attention object deciding part 33 decides the attention object based on the user instruction received through the manipulation receiving part 12 in regard to the result presented by the attention object presenting part 32, and transmits the photographing object information #23a including the information indicating the decided attention object to the image data storage controller 24.

The attention object deciding part 33 issues an instruction to the photographing part 11 to perform the photographing such that the photographing device 1 focuses on the decided attention object.

(Processing Flow in Photographing Device 1)

Pieces of processing in the photographing device 1 will be described below with reference to FIGS. 14 to 16.

(Attention Object Storage Processing)

A flow of the processing of simply storing the attention object will be described with reference to FIGS. 14 and 15.

Figure 14:
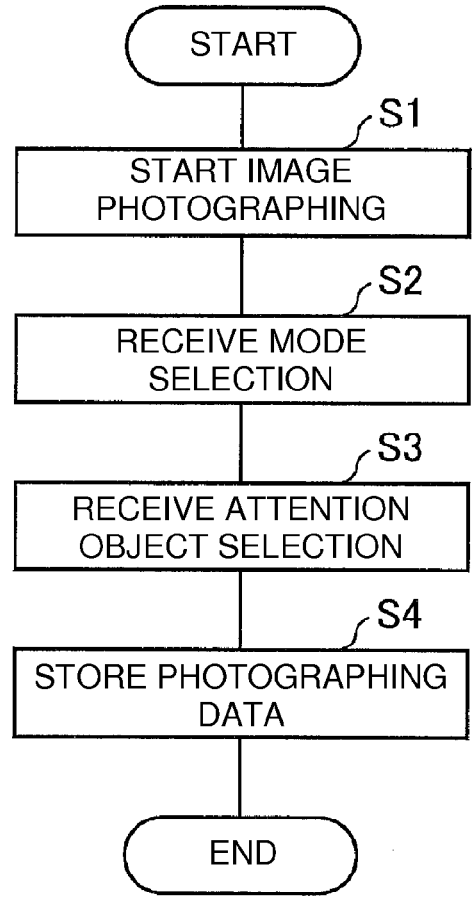
FIG. 14 is a flowchart illustrating a flow of attention object storage processing in the photographing device.
Figure 15:
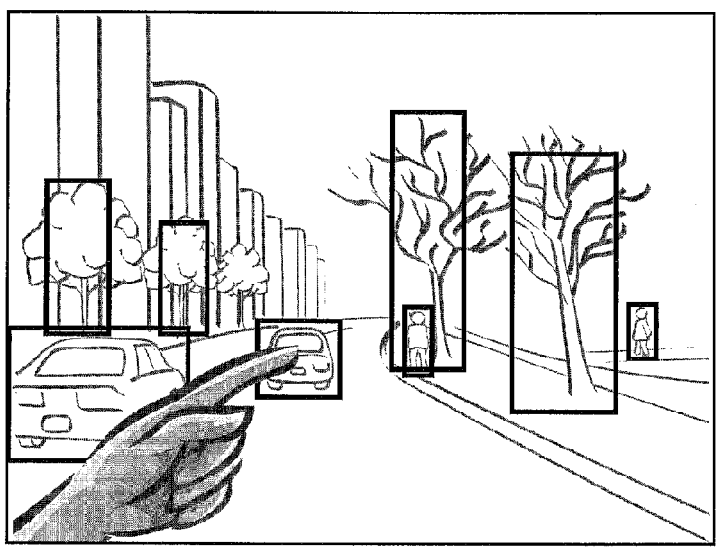
FIG. 15 is a view illustrating an attention object selecting method.

FIG. 14 is a flowchart illustrating a flow of the processing of storing the attention object. FIG. 15 is a view illustrating a photographing screen when the attention object is stored.

In the case that the attention object is stored, as illustrated in FIG. 14, the photographing device 1 starts the image photographing (S1). The mode setting part 22 receives the setting of the attention object storage mode through the manipulation receiving part 12 (S2), and an instruction to store the object as the attention object from the photographed image displayed on the display part 13 is received (S3). For example, as illustrated in FIG. 15, the instruction may be issued such that the object stored as the attention object is selected by a user's finger in the photographed image displayed on the display part 13, or the instruction may be issued such that a pointer displayed on the display part 13 is matched with the position of the object stored as the attention object.

When the attention object selection deciding part 23 receives the instruction of the attention object, the image data storage controller 24 stores the object as the attention object in the storage 14 while correlating the object with the image data (S4). Similarly to the photographing history, for the data stored through the attention object storage processing, the image ID 411, the image data 412, the photographing date and time 413, the detected object (the position, the size, and the attention) 414, and the user 415 are correlated with one another.

The flow of the attention object storage processing is described above.

(Photographing Processing)

A flow of photographing processing will be described below with reference to FIG. 16. FIG. 16 is a flowchart illustrating the flow of the photographing processing in the photographing device 1.

Figure 16:
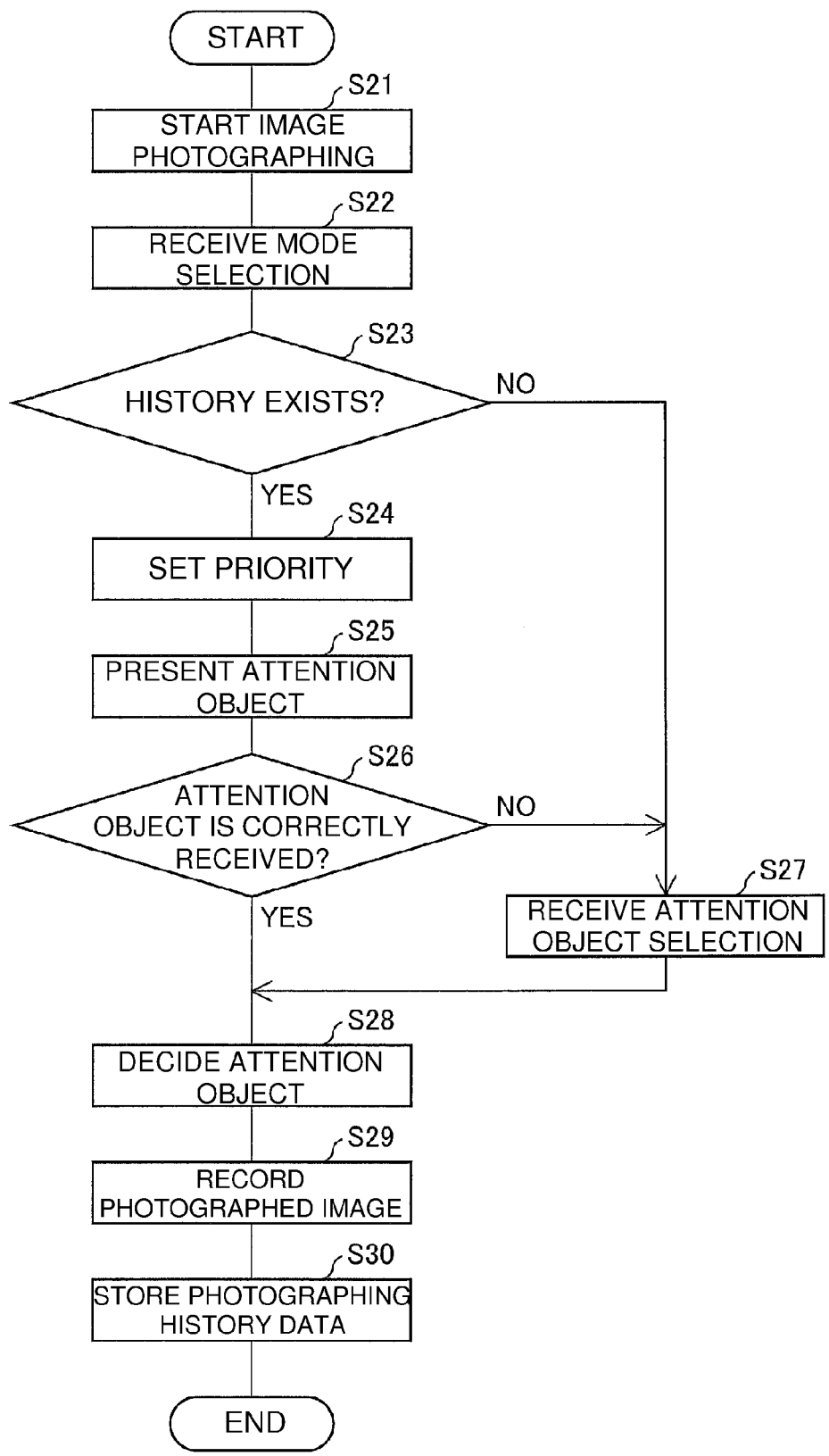
FIG. 16 is a flowchart illustrating a flow of photographing processing in the photographing device.

In the photographing processing, as illustrated in FIG. 16, the photographing device 1 starts the image photographing (detection step S21). The mode setting part 22 receives the setting of the photographing mode through the manipulation receiving part 12 (S22). The attention object selection deciding part 23 determines whether the photographing history is stored in the storage 14 (S23). When the photographing history is stored in the storage 14 (YES in S23), the priority setting part 31 of the attention object selection deciding part 23 sets the priority on the object from the photographing history (priority setting step S24). The attention object presenting part 32 selects the attention object from the objects detected by the object detector 21 using the priority set by the priority setting part 31, and presents the selected attention object on the display part 13 (presenting step S25).

When receiving the response that the presented attention object is correct from the user through the manipulation receiving part 12 (YES in S26), the attention object deciding part 33 of the attention object selection deciding part 23 decides the object as the attention object (S28). Whether the presented attention object is correct may be received such that the presented attention object is pressed by the user's finger on the display part 13 or such that a correct button (not illustrated) is pressed by the user's finger.

On the other hand, when the photographing history is not stored in the storage 14 (NO in S23) or when the response that the presented attention object is not correct is received from the user through the manipulation receiving part 12 (No in S26), the attention object selection deciding part 23 receives the selection of the attention object (S27). The response that the presented attention object is not correct and the selected attention object may be simultaneously received. That is, in the case that the object different from the presented attention object is selected, that the presented attention object is not correct and that the selected attention object is the attention object may be indicated.

The attention object selection deciding part 23 decides the received attention object as the attention object (S28).

The photographing device 1 photographs (records) the image while focusing on the decided attention object (S29), and the image data storage controller 24 stores the photographed image in the storage 14 while correlating the photographed image with the corresponding attention object, the detected object, and the photographing date and time (S30).

The present invention is not limited to the embodiment, but various changes and modifications can be made without departing from the scope of the present invention. That is, the present invention also includes the embodiment obtained by combining the technical means properly changed without departing from the scope of the present invention.

(Configuration by Software)

Each block of the photographing device 1, particularly the object detector 21, the mode setting part 22, the attention object selection deciding part 23 (the priority setting part 31, the attention object presenting part 32, and the attention object deciding part 33), and the image data storage controller 24 may be constructed in a hardware manner by a logical circuit formed on an integrated circuit (IC chip), or in a software manner using a CPU (Central Processing Unit).

In the latter, the photographing device 1 includes the CPU that executes a command of a control program implementing each function, a ROM (Read Only Memory) in which the control program is stored, a RAM (Random Access Memory) in which the control program is expanded, and a storage device (recording medium) in which the control program and various pieces of data are stored. The object of the present invention can also be achieved such that a recording medium in which a program code (an executable format program, an intermediate code program, a source program) of the control program for the photographing device 1, which is the software implementing the above functions, is stored while being readable by a computer is supplied to the photographing device 1, and such that the computer (or a CPU or an MPU (Micro Processing Unit)) reads and executes the program code recorded in the recording medium.

Examples of the recording medium include tape systems such as magnetic tape and cassette tape, disk systems including magnetic disks such as floppy disk (registered trademark) and a hard disk and optical disks such as a CD-ROM, an MO, an MD, a DVD, and a CD-R, card systems such as an IC card (including a memory card) and an optical card, semiconductor memory systems such as a mask ROM, an EPROM, an EEPROM and a flash ROM, and logic circuit systems such as a PLD and a FPGA.

The imaging device 1 is configured to be able to be connected to a communication network, and the program code may be supplied through the communication network. There is no particular limitation to the communication network as long as the program code can be transmitted. Examples of the communication network include the Internet, an intranet, an extranet, a LAN (Local Area Network), an ISDN (Integrated Services Digital Network), a VAN (Value-Added Network), a CATV (Community Antenna Television) communication network, a virtual private network, a telephone line network, a mobile communication network, and a satellite communication network. A transmission medium constituting the communication network is not limited to the specific structure or the specific kind, but any transmission medium constituting the communication network may be used as long as the program codes can be transmitted. Examples of the transmission medium include wired lines such as IEEE (Institute of Electrical and Electronic Engineers) 1394, a USB, a power-line carrier, a cable TV line, a telephone line, and an ADSL (Asynchronous Digital Subscriber Loop) line and wireless lines such as infrared ray such as IrDA (Infrared Data Association) and a remote controller, Bluetooth (registered trademark), IEEE802.11 wireless, HDR (High Data Rate), NFC (Near Field Communication), DLNA (Digital Living Network Alliance), a mobile telephone network, a satellite line, and a terrestrial digital network. The invention can be implemented in the form of a computer data signal embedded in a carrier wave in which the program code is embodied by electronic transmission.

The present invention is suitable to the photographing device provided with the autofocus function because the focused subject can properly be selected.

The invention claimed is:

1. A photographing device comprising:
   a first photographing part configured to photograph a plurality of subjects;
   an autofocus part configured to focus a lens on any one of the subjects;
   a detector configured to detect the plurality of subjects from an image photographed by the first photographing part;
   a priority setting part configured to set a priority on each of the plurality of subjects detected by the detector using one or a plurality of pieces of photographing history information, the photographing history information including focused subject information that shows one or a plurality of focused subjects in a history image, the focused subject information being related to the history image, the history image being photographed by the first photographing part in the past, the subject information being correlated with the history image in the photographing history information, and the priority setting part being configured to set a higher priority on the focused subject than that set on a non-focused subject, in the subjects indicated by the subject information, on which the lens is not focused;
   a focused subject selector configured to select the subject on which the autofocus part focuses the lens from the plurality of subjects in order of the priority set by the priority setting part; and
   a presenting part configured to present the subject selected by the focused subject selector.

2. The photographing device according to claim 1, wherein the priority setting part, which sets the priority using the plurality of pieces of photographing history information, is configured to count a number of times at which each subject is focused on in the plurality of pieces of photographing history information and set a higher priority on the subject having a larger count value.

3. The photographing device according to claim 1, wherein the priority setting part, which sets the priority using the plurality of pieces of photographing history information, is configured to count a number of times at which each subject is focused on in the plurality of pieces of photographing history information by each category to which the subject belongs, set a higher priority on the subject included in a category having a larger count value, and set a higher priority on the focused subject having a larger count value in the subjects included in the identical category.

4. The photographing device according to claim 1, wherein:
   photographing date and time are correlated with the history image in the photographing history information; and the priority setting part, which sets the priority using the plurality of pieces of photographing history information, is configured to set a highest priority on the subject when the subjects are identical with each other in the pieces of photographing history information in which the most recent photographing dates and times are continued.

5. The photographing device according to claim 1, wherein size information indicating a size of the subject included in the history image is correlated with the subject information in the photographing history information; and
   the priority setting part is configured to set a higher priority on the focused subject than that of a non-focused subject that is the subject on which the lens is not focused when the size of the focused subject is smaller than the size of the non-focused subject in the subjects indicated by the subject information.

6. The photographing device according to claim 1, wherein:
   positional information indicating a position of the subject included in the history image is correlated with the subject information in the photographing history information; and
   the priority setting part is configured to set a higher priority on the focused subject than that of a non-focused subject that is the subject on which the lens is not focused when the position of the focused subject is located more peripheral than the position of the non-focused subject in the history image in the subjects indicated by the subject information.

7. The photographing device according to claim 1, wherein:
   the priority setting part that sets the priority using the plurality of pieces of photographing history information is configured to set a higher priority on the subject in which the subject information is not included in the photographing history information.

8. The photographing device according to claim 1, wherein the focused subject selector is configured to select a predetermined number of subjects on which the lens is focused in a descending order of the priority set by the priority setting part.

9. The photographing device according to claim 1, further comprising:
   a photographing history information storage in which the photographing history information is stored;
   a receiving part configured to receive whether the focused subject presented by the presenting part is correct; and
   a storage controller configured to store the focused subject information indicating the focused subject in the photographing history information storage while correlating the focused subject information with the photographed image when the receiving part receives the focused subject presented by the presenting part as correct.

10. The photographing device according to claim 9, further comprising:
    a detected subject presenting part configured to present the subject detected by the detector from a subject selecting photographed image, which is photographed in order to select the subject by the first photographing part; and
    a selection receiving part configured to receive selection of the focused subject from the subjects presented by the detected subject presenting part;
    wherein the storage controller is configured to store the focused subject information indicating the focused subject in which the selection is received by the selection receiving part in the photographing history information storage as the photographing history information while correlating the focused subject information with the subject selecting photographed image.

11. The photographing device according to claim 1, further comprising:
- a second photographing part configured to photograph a photographer who photographs the photographed image; and
- a photographer identifying part configured to identify the photographer photographed by the second photographing part;
- wherein user identification information identifying a user who photographs the history image is correlated with the history image in the photographing history information and the priority setting part is configured to set the priority using the photographing history information that agrees with the photographer identified by the photographer identifying part.

12. A method for controlling a photographing device, the photographing device comprising a photographing part configured to photograph a plurality of subjects and an autofocus part configured to focus a lens on any one of the subjects, the method comprising:
- detecting the plurality of subjects from an image photographed by the photographing part;
- setting a priority on each of the plurality of subjects detected in the detecting step using one or a plurality of pieces of photographing history information, the photographing history information including focused subject information that shows one or a plurality of focused subjects in a history image, the focused subject information being related to the history image, the history image being photographed by the photographing part in the past the subject information being correlated with the history image in the photographing history information, and the setting of the priority including setting a higher priority to the focused subject than that set to a non-focused subject, in the subjects indicated by the subject information, on which the lens is not focused; and
- selecting the subject on which the autofocus part focuses the lens in the plurality of subjects in order of the priority set and presenting the selected subject.

13. A photographing device controlling program stored on a non-transitory computer-readable medium that performs a method for controlling a photographing device, the photographing device comprising a photographing part configured to photograph a plurality of subjects and an autofocus part configured to focus a lens on any one of the subjects, the photographing device controlling program causing a computer to:
- detect the plurality of subjects from an image photographed by the photographing part;
- set a priority on each of the plurality of subjects detected in the detecting step using one or a plurality of pieces of photographing history information, the photographing history information including focused subject information that shows one or a plurality of focused subjects in a history image, the focused subject information being related to the history image, the history image being photographed by the photographing part in the past the subject information being correlated with the history image in the photographing history information, and the priority being set by setting a higher priority to the focused subject than that set to a non-focused subject, in the subjects indicated by the subject information, on which the lens is not focused;
- select the subject on which the autofocus part focuses the lens in the plurality of subjects in order of the priority set and presenting the selected subject.

14. A non-transitory computer-readable recording medium in which the photographing device controlling program according to claim 13 is recorded.

* * * * *